United States Patent
Nakajima et al.

(10) Patent No.: US 9,777,617 B2
(45) Date of Patent: Oct. 3, 2017

(54) INTERNAL COMBUSTION ENGINE COOLING DEVICE

(75) Inventors: Tadao Nakajima, Tokyo (JP); Toshitaka Suzuki, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 428 days.

(21) Appl. No.: 13/877,171

(22) PCT Filed: Sep. 12, 2011

(86) PCT No.: PCT/JP2011/070713
§ 371 (c)(1),
(2), (4) Date: Mar. 31, 2013

(87) PCT Pub. No.: WO2012/063547
PCT Pub. Date: May 18, 2012

(65) Prior Publication Data
US 2013/0180477 A1    Jul. 18, 2013

(30) Foreign Application Priority Data

Nov. 8, 2010    (JP) .................................. 2010-249510

(51) Int. Cl.
*B60H 1/32*    (2006.01)
*H05B 1/02*    (2006.01)
(Continued)

(52) U.S. Cl.
CPC ................ *F01P 7/16* (2013.01); *F01P 7/167* (2013.01); *F16K 31/002* (2013.01);
(Continued)

(58) Field of Classification Search
CPC ... F01M 5/007; F01P 7/026; F01P 7/14; F01P 7/16; F16K 17/383; F16K 31/002;
(Continued)

(56) References Cited

U.S. PATENT DOCUMENTS 3,334,812 A * 8/1967 Stimets ..................... F01P 7/16
                                                        236/100
3,756,083 A   9/1973 Tatsutomi et al.
(Continued)

FOREIGN PATENT DOCUMENTS

DE    2101173 A1    7/1971
DE    4031047 A1    4/1992
(Continued)

OTHER PUBLICATIONS

International Preliminary Report for PCT/JP2011/070713 dated May 14, 2013.
(Continued)

*Primary Examiner* — Frantz Jules
*Assistant Examiner* — Daniel C Comings
(74) *Attorney, Agent, or Firm* — Isshiki International Law Office; Joseph P. Farrar, Esq.

(57) ABSTRACT

An internal combustion engine cooling device includes a piston fixedly mounted within a device housing coupled to a plurality of flow paths through which cooling water flows, the piston disposed facing the interior of the device housing; a cylinder container that advances and retreats relative to the piston and has a flange valve that opens and closes a main flow path of the cooling water; a thermal expansion unit provided within the cylinder container that causes the cylinder container to advance and retreat due to volumetric changes attendant upon temperature changes; and a heat-emitting element provided within a piston casing that heats the thermal expansion unit when supplied with electricity. An insulating cover is provided to the exterior of the cylinder container at a portion of the cylinder container disposed facing the cooling water.

9 Claims, 6 Drawing Sheets

(51) Int. Cl.
*G05D 23/01* (2006.01)
*F16K 35/06* (2006.01)
*G05D 23/02* (2006.01)
*G05D 23/19* (2006.01)
*F01P 7/16* (2006.01)
*F16K 31/02* (2006.01)
*F16K 31/00* (2006.01)
*G05D 23/12* (2006.01)

(52) U.S. Cl.
CPC ........ *F16K 31/025* (2013.01); *F01P 2070/04* (2013.01); *G05D 23/022* (2013.01); *G05D 23/12* (2013.01); *G05D 23/123* (2013.01); *G05D 23/125* (2013.01)

(58) Field of Classification Search
CPC .. F16H 57/0412; F16H 57/0413; F28F 27/02; F28F 2250/06; G05D 23/022; G05D 23/123; G05D 23/132; G05D 23/1333; G05D 23/136; G05D 23/1393
USPC ......... 165/103, 297, 298, 916; 236/34.5, 40, 236/93 A, 99 K, 99 J, 99 R; 251/31, 322
See application file for complete search history.

(56) References Cited

U.S. PATENT DOCUMENTS

| | | | |
|---|---|---|---|
| 4,666,081 A | 5/1987 | Cook et al. | |
| 5,385,296 A * | 1/1995 | Kurz | G05D 23/1921 236/34.5 |
| 5,482,010 A * | 1/1996 | Lemberger et al. | 123/41.1 |
| 5,775,270 A * | 7/1998 | Huemer et al. | 123/41.1 |
| 6,371,059 B1* | 4/2002 | Lemberger et al. | 123/41.1 |
| 6,378,776 B1* | 4/2002 | Chamot et al. | 236/100 |
| 6,644,619 B2* | 11/2003 | Friesenhahn et al. | 251/11 |
| 2002/0059906 A1* | 5/2002 | Friesenhahn et al. | 123/41.1 |
| 2011/0095091 A1 | 4/2011 | Suda et al. | |

FOREIGN PATENT DOCUMENTS

| | | | |
|---|---|---|---|
| DE | 19844711 | 3/2000 | |
| GB | 1132280 A * | 10/1968 | ............... F01P 7/16 |
| JP | S63006284 U | 1/1988 | |
| JP | 04307195 A * | 10/1992 | |
| JP | 5-177664 * | 7/1993 | ............. B29C 45/26 |
| JP | H08-320087 A | 12/1996 | |
| JP | H10220633 A | 8/1998 | |
| JP | H10220634 A | 8/1998 | |
| JP | 2005-155331 A | 6/2005 | |
| WO | 2010004606 A1 | 1/2010 | |

OTHER PUBLICATIONS

International Search Report for PCT/JP2011/070713 dated Dec. 13, 2011.

Extended European Search Report for Application No. EP11840600 dated Oct. 20, 2016.

* cited by examiner

FIG. 7

INTERNAL COMBUSTION ENGINE COOLING DEVICE

CROSS-REFERENCE TO RELATED APPLICATIONS

The present application is a continuation of international application no. PCT/JP2011/070713, filed on Sep. 12, 2011, which in turn claims priority from Japanese patent application no. 2010-249510, filed on Nov. 8, 2010, the entire disclosures of which are hereby incorporated by reference herein.

BACKGROUND OF THE INVENTION

Technical Field

The present invention relates to a thermostat device as a cooling device of an internal combustion engine (hereinafter referred to as an engine) that variably controls water temperature in a water-cooled temperature control system that variably controls the cooling water temperature of an engine for use in an automobile or the like, for example, and more particularly, to a mounting structure for a device housing of a thermo-element assembly thereof.

Background Art

For example, a thermostat device installed in a water-cooled system of an engine has a built-in thermal expansion unit (wax) that senses changes in temperature of the cooling water flowing through a circulatory flow path and expands and contracts accordingly. The thermostat device opens and closes a valve using volumetric changes attendant upon the expansion and contraction of the wax and functions to maintain the cooling water at a predetermined temperature.

Conventionally, as a thermostat device of this type, for example, one which, together with being disposed within a housing connected to a plurality of flow paths, has a piston fixedly mounted within the housing, a cylinder container that advances and retreats relative to the piston, wax provided within the housing that causes the cylinder container to advance and retreat due to volumetric changes attendant upon temperature changes, and a heat-emitting element provided within a piston casing that heats the wax when supplied with electricity, is known (see JP-2005-155831-A).

In a device with such a conventional structure, the heat-emitting element is composed of a thermally conductive extension member that penetrates into the interior of the casing from outside the piston casing, a heat-emitting portion formed within the part of the extension member inside the casing, and an electrode portion constructed of the part of the extension member outside the casing and electrically connected to the heat-emitting portion. A terminal that supplies voltage to the heat-emitting portion is contacted against the electrode part to electrically connect the heat-emitting portion with a voltage supply source. Then, by selectively causing the heat-emitting portion to emit heat, heat is conducted to the thermo-sensitive part wax and the cylinder container advances and retreats relative to the piston, such that the thermostat device is able to be caused to operate by electrical control regardless of the cooling water temperature.

With a construction such as this, because the terminal that supplies the voltage contacts the electrode of the extension member and is configured to be attachably detachable from the heat-emitting element, assembly and maintenance are easy. In addition, because the heat-emitting part of the heat-emitting element is formed inside the extension member and only the electrode part to which a voltage is applied is formed by the extension part, a highly durable heat-emitting element that does not break easily is able to be obtained. Moreover, because the heat-emitting element is provided within the piston casing, heat is able to be emitted substantially uniformly from the circumferential surface of the piston, and the thermal expansion unit is able to be heated effectively.

In a conventional electrically controlled thermostat device like that described above, the thermo-sensitive portion of the thermo-element assembly is normally exposed to the cooling water and thus is configured to be affected by the temperature of the cooling water, thereby enabling the device to function as a thermostat.

However, with a conventional device of this type, because it forcibly opens a main valve even at low temperatures in response to a requirement to defrost, for example, it is necessary to cover the thermo-sensitive portion of the thermo-element with a thermal insulation cover separate from the thermo-element, thereby rendering the thermo-sensitive portion less susceptible to the water temperature at low temperatures.

Although it is necessary to forcibly open the main valve, to reduce weight the cylinder container has thin walls. In that case, however, the wax is too easily affected by the cooling water temperature at low temperatures and does not easily heat up even with the use of a heater. In addition, compared to the case itself, which has thick walls, the cover that makes the case thin is lightweight.

In particular, this type of thermo-element thermo-sensitive portion is necessary in order to sense the temperature of the cooling water with wax, with the result that employing a thermal insulation structure involving a thermal insulation cover on this portion is not simply a matter of placing the thermal insulation on the thermo-sensitive portion but instead requires that some sort of special measures be taken. That is, it is necessary to satisfy two contradictory requirements: Namely, expanding and contracting the wax through the effects of heat from the temperature of the cooling water when necessary and securing the necessary operating conditions, while securing operating conditions that make use of the heat emitted by the heat-emitting element under required conditions when electrical control is necessary.

Moreover, in the above-described conventional device, in a case in which the thermal insulation cover is composed of only resin, the thermal insulation cover portion contacts a main valve spring and a bypass valve spring. The friction of contact between the main valve spring made of metal and the bypass valve spring made of metal, on the one hand, and the thermal insulation cover made of resin on the other damages or destroys the cover, with the possibility that pieces of resin get into the coolant circuit. To eliminate such a possibility, a metal washer or the like is placed between the contacting parts when the spring is contacted. But doing so raises a structural problem in the form of an increase in the number of components, and this point too must be given consideration.

SUMMARY OF THE INVENTION

The present invention is conceived in light of the circumstances described above and has as its object to achieve a thermostat device as an internal combustion engine cooling device capable of degrading the thermo-sensitive impact of the cooling water on the thermostat thermo-sensitive portion and more appropriately and more reliably controlling the opening and closing of the main valve at any timing dictated by an electric heater.

To achieve this object, the present invention (according to claim 1) provides an internal combustion engine cooling device comprising a piston fixedly mounted within a device housing coupled to a plurality of flow paths through which cooling water flows, the piston disposed facing the interior of the device housing; a cylinder container that advances and retreats relative to the piston and has a flange valve that opens and closes a main flow path of the cooling water; a thermal expansion unit provided within the cylinder container that causes the cylinder container to advance and retreat due to volumetric changes attendant upon temperature changes; and a heat-emitting element provided within a piston casing that heats the thermal expansion unit when supplied with electricity, wherein a insulating cover is provided to the exterior of the cylinder container at a portion of the cylinder container disposed facing the cooling water.

The present invention (according to claim 2) provides an internal combustion engine cooling device according to the present invention comprising a piston fixedly mounted within a device housing coupled to a plurality of flow paths through which cooling water flows, disposed facing the interior of the device housing; a cylinder container that advances and retreats relative to the piston and has a flange valve that opens and closes a main flow path of the cooling water; a thermal expansion unit provided within the cylinder container that causes the cylinder container to advance and retreat due to volumetric changes attendant upon temperature changes; and a heat-emitting element provided within a piston casing that heats the thermal expansion unit when supplied with electricity, wherein a insulating cover is provided to the exterior of the cylinder container at a portion of the cylinder container disposed facing the cooling water, the internal combustion engine cooling device comprising a seating that functions as a spring seat that engages one end of a spring means that biases a second flange valve movably provided at the tip of a thermo-sensitive portion of the cylinder container that opens and closes a sub flow path of the cooling water.

The present invention (according to claim 3) provides the internal combustion engine cooling device as claimed in claim 1 or 2, wherein a resinous insulating material is provided on the inside of the insulating cover.

The present invention (according to claim 4) provides the internal combustion engine cooling device as claimed in claim 1 or 2, wherein a resinous insulating material is provided on the inside of the insulating cover to form a insulating part constituted as a multi-layered structure composed of a resinous insulating material layer and a layer of air between the insulating cover and the outer surface of the cylinder container.

The present invention (according to claim 5) provides the internal combustion engine cooling device as claimed in claim 1 or 2, wherein the insulating cover is formed to form a layer of air between the insulating cover and the outer surface of the cylinder container.

EFFECT OF THE INVENTION

The present invention of this type, by baking a resinous insulating material onto the inside of an insulating cover made of metal, using a multi-layered structure shaped to form a localized layer of air in the resinous insulating material, and surrounding the thermo-element thermo-sensitive portion with the layer of air, degrades thermo-sensitivity to the cooling water at the thermo-element thermo-sensitive portion, thereby providing the ability to achieve a necessary thermostat operating state depending on the environment by executing the necessary electrical control of the heat-emitting element.

In addition, because a seating that functions as a spring seat that engages one end of a valve spring is provided on a portion of the insulating cover, the present invention alleviates the necessity of adding an extra component as a spring seat, thereby simplifying the structure, providing superior operability, and in terms of cost allowing use of an inexpensive structure.

According to the internal combustion engine cooling device of the present invention as described above, an insulating cover made of metal is provided to at least the thermo-sensitive portion of the cylinder container as a thermo-element and is able to provide the necessary insulation effect, such that, despite the simplicity of the configuration, thermo-sensitivity to cooling water at the thermo-sensitive portion of the thermo-element is degraded and effect of the cooling water temperature is minimized, providing simpler and more reliable control of the opening and closing of the main valve at any timing dictated by the electric heater H. Moreover, due to the heat retention capability provided by the insulating material and the piston lift retention capability provided by the heat retention capability, the necessary operating state as the thermostat device is able to be obtained. Further, the quantity of electric power supplied to the electric heater and the length of time that the electric heater is supplied with power are able to be reduced, providing an energy-saving effect as well.

In particular, according to the present invention, by using a structure that provides a resinous insulating material, a multi-layered structure composed of an insulating material layer made of resinous insulating material and a layer of air, or a layer of air to a portion of the insulating cover corresponding to the thermo-element thermo-sensitive portion, thermo-sensitivity at the thermo-element thermo-sensitive portion is able to be degraded and reduced to a desired state, thereby providing the superior effect of being able to obtain a necessary thermostat operating state.

DETAILED DESCRIPTION OF EMBODIMENTS OF THE INVENTION

Figure 1:
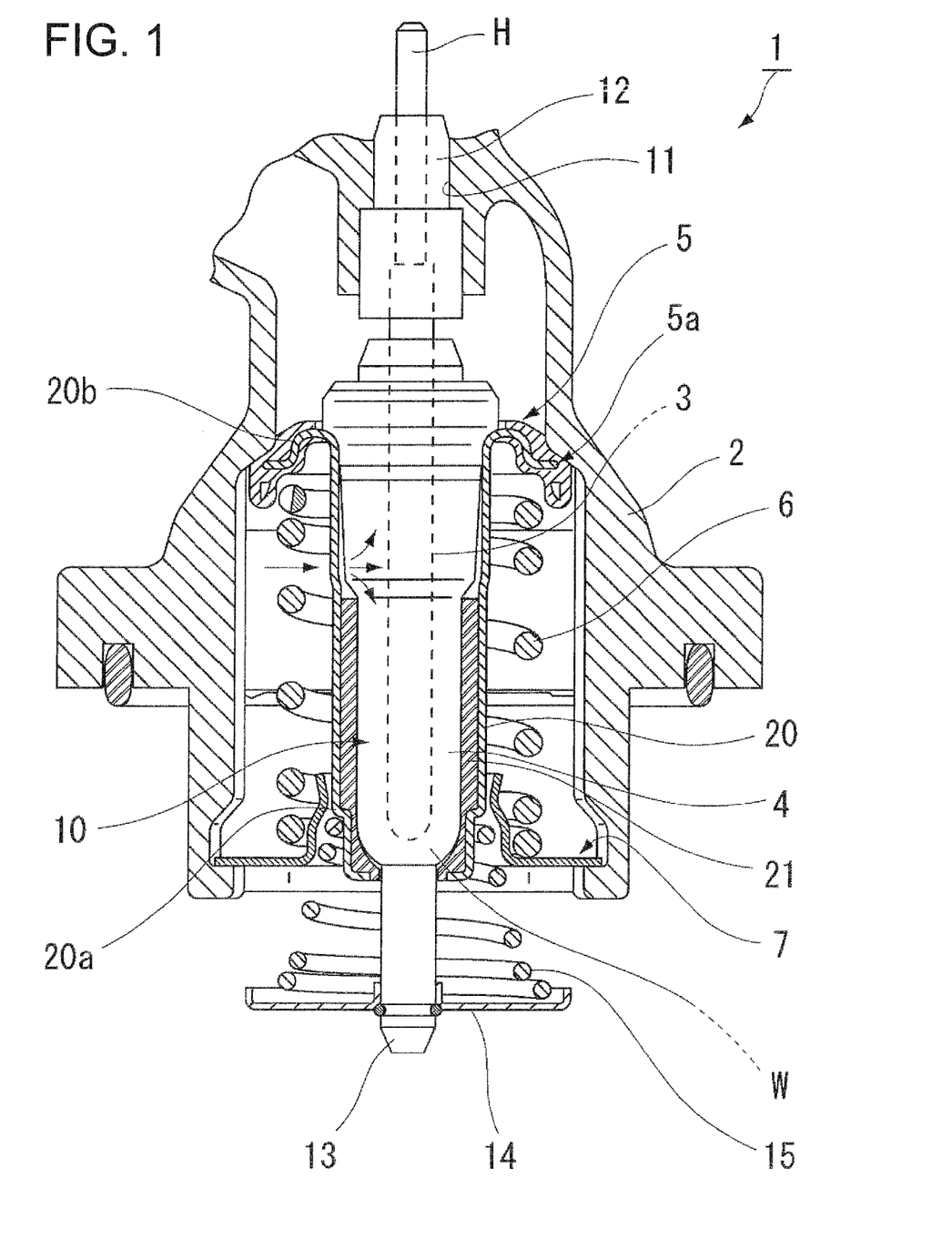
FIG. 1 shows an embodiment of an internal combustion engine cooling device according to the present invention, and is a schematic cross-sectional view showing the schematic configuration of a thermostat device as a whole.
Figure 2:
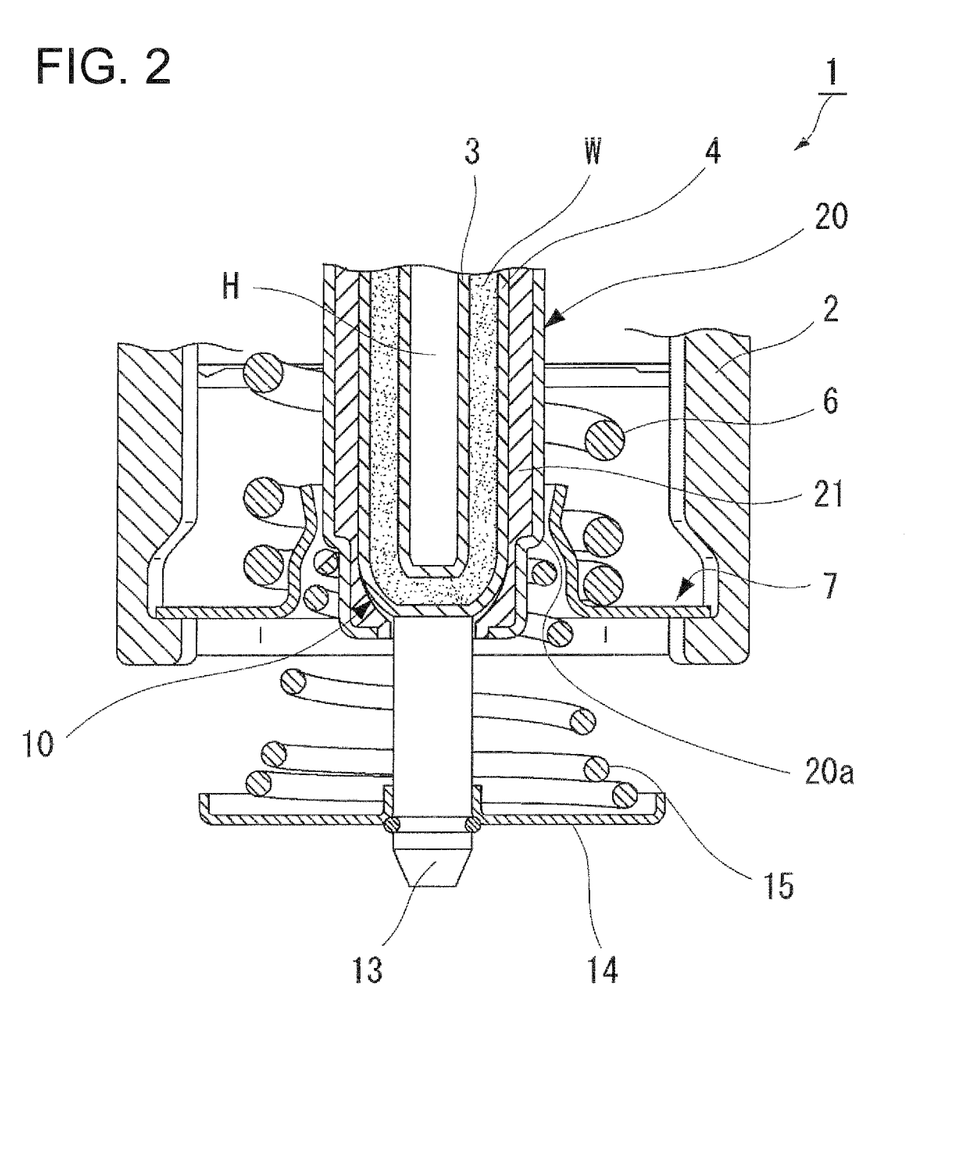
FIG. 2 is an enlarged cross-sectional view of the main part of the thermostat device shown in FIG. 1.

FIG. 1 and FIG. 2 show one embodiment of an internal combustion engine cooling device according to the present invention.

In these drawings, the thermostat device, which is designated as a whole by reference numeral 1, is installed inside a device housing (hereinafter referred to as simply housing) 2 that is linked to a plurality of flow paths through which cooling water flows, and functions to open and close the flow paths by operating a valve.

The thermostat device 1 is provided with a piston 3 fixed within the housing 2 in a vertically suspended state and a cylinder container (thermo-element case) 4 that advances and retreats relative to the piston 3. The thermostat device 1 is further provided with a flange valve 5 that is formed around the outside of the top end of the cylinder container 4 and which opens and closes the main flow path of the water cooling water, a spring 6 that is wound around the cylinder container 4 and one end of which contacts the back of the flange valve 5, and a bottom flange 7 that is formed around the bottom of the cylinder container 4 and which the other end of the spring 6 contacts.

The piston 3 is a long metal pipe the tip of which is sealed to form a circular pipe shape. The cylinder container 4 is fitted onto the outside of the piston 3 and wax W as a thermal expansion unit is inserted inside the piston 3 to construct a thermo-element assembly (thermo-element) 10.

As the temperature of the wax W rises the volume of the wax W expands, moving the piston 3 forward and backward relative to the cylinder container 4. That is, because the piston 3 is fixed to the housing 2, the cylinder container 4 slides downward, a valve seat 5a separates from the flange valve 5 at the top of the cylinder container 4, and the cooling water flow path is opened.

Conversely, as the temperature of the wax W falls, when the piston 3 is in a contracted state the elastic force of the spring 6 forces the flange valve 5 onto the valve seat 5a, thereby closing the cooling water flow path.

The cylinder container 4 has a hollow cylindrical space inside, into which the piston 3 is inserted to form a gap into which the wax W is inserted. A top opening of the cylinder container 4 is sealed with a seal member that slidably supports the piston.

The housing 2 has an installation aperture 11 formed therein for installing and fixedly mounting a top end of the piston 3 that forms the thermo-element assembly 10. A cylindrical portion 12 provided to the top end of the piston is fitted into and held in place by the installation aperture 11.

A rod 13 extends from a bottom end of the cylinder container 4, where a second flange valve (bypass valve) 14 that opens and closes a bypass flow path (not shown) that constitutes a sub flow path that is selectively communicated with the main flow path of the cooling water is slidably provided. A bypass valve spring 15 constantly biases the second flange valve 14 in the closed direction.

Reference character H in the drawings designates a rod-shaped heater as a heat-emitting element that provides heat to the wax W when supplied with electricity. A thermally conductive material such as silicon or the like is inserted into the tip of the piston 3 and forms a single integrated unit with the piston 3.

As is known, the rod-shaped heater H has a structure in which a heating wire is embedded in a heat-resistant insulating material such as ceramic, for example. The rod-shaped heater H is inserted into the casing of the piston 3. When electrically connected to an external power source through a controller (not shown), it emits heat as necessary to heat the wax W. With this configuration, the cylinder container 4 is thus made to advance and retreat along the piston 3, opening and closing flow path valves in the process.

It is to be noted that a top end of the rod-shaped heater H is led outside the device housing 2 and connected via a controller to a not-illustrated external power source.

A rod-shaped heater H of this type may be pre-inserted into the piston and configured as the thermo-element assembly 10. Alternatively, it may be installed on a cylindrical portion 21 side and then installed inside the piston 3 once the thermo-element assembly 10 is installed in the housing.

According to the present invention, in the thermostat device 1 having the configuration described above, a insulating cover 20 made of metal or the like and having a substantially cylindrical shape and formed so as to cover the outside of a thermo-sensitive portion into which the wax W of the cylinder container 4 has been inserted is provided as shown in FIG. 1 and FIG. 2. A seating 20a is provided that functions as a spring seat that engages one end of the bypass valve spring (spring means) that biases the second flange valve 14 movably provided on the rod 13 at the tip of the thermo-sensitive portion of the cylinder container 4 in the closed direction.

The insulating cover 20 is not limited to one made of metal. Provided that the material is one that is able to obtain the necessary insulating effect, it may be made of ceramic, resins, or, for example, an elastic material such as rubber.

The seating 20a is formed of a stepped portion, a step, and a portion of reduced diameter of the insulating cover 20.

Further, a resinous insulating material 21 is provided on the inside of the insulating cover 20 as shown in FIG. 1 and FIG. 2. This resinous insulating material 21 is inserted into the space between the inside of the insulating cover 20 and the outer surface of the cylinder container 4 that becomes the thermo-element and is baked, etc., onto the inside of the cover.

In the present embodiment, the substantially cylindrical insulating cover 20 is disposed so as to cover the cylinder container 4 that becomes the thermo-element along virtually the entire length of the cylinder container 4 in its axial direction. A top end of the insulating cover 20 is formed continuous with a valve plate 20b of the flange valve 5, and constitutes the flange-like valve body that constitutes the flange valve 5.

As shown in FIG. 1, the resinous insulating material 21 described above is baked onto the back side of the insulating cover 20 at a position that covers the thermo-sensitive portion of the cylinder container 4 that is the thermo-element case. As is clear from FIG. 1 and FIG. 2, the resinous insulating material 21 is positioned at a portion corresponding to the wax W inside the case, and prevents the heat of the hot cooling water from reaching the wax W.

In other words, by covering the wax W portion inside the cylinder container 4 over its entire circumference with the insulating cover 20 and the resinous insulating material 21 on the inside of the insulating cover 20, the heat of the hot cooling water is isolated.

It is to be noted that, as shown by the arrows in FIG. 1, the heat of the hot cooling water flowing through the flow paths on the outside of the insulating cover 20 invades the interior of the cylinder container 4 from the top of the cylinder container 4 where there is no resinous insulating material 21 on the inside of the insulating cover 20, and causes the wax W to expand and contract.

Use of this type of m insulating cover 20 made of metal enables at least the thermo-sensitive portion of the cylinder container (thermo-element case) 4 to be thermally insulated and protected in a necessary state, by which the thermal sensitivity to the cooling water temperature at the thermo-element thermo-sensitive portion is able to be degraded, providing simpler and more reliable control of the opening and closing of the main valve at any timing dictated by the electric heater H, and thereby obtaining the necessary operating state as the thermostat device 1.

By providing the insulating cover 20 described above, the effect of the hot water at low temperatures, which conventionally was a problem during the demand for defrosting, is able to be diluted, which enables the thermostat device 1 to carry out thermostat operations in a desired state.

In addition, with the structure described above, because the insulating cover 20 is made of metal and a seating 20a that is the spring seat is provide at one portion of the insulating cover 20, there is no need to provide an extra spring seat as is conventionally the case. As a result, the number of component parts and assembly steps is able to be reduced.

It is to be noted that the present invention is not limited to the structure described in the embodiment described above, and accordingly, the shapes and structures of the parts that constitute the thermostat device 1 may be modified and changed as convenient.

For example, although in the embodiment described above the resinous insulating material 21 is interposed at a portion corresponding to the thermo-element thermo-sensitive portion of the insulating cover 20, nevertheless the present invention is not limited thereto and thus the version described below may be adapted as convenient.

Figure 3:
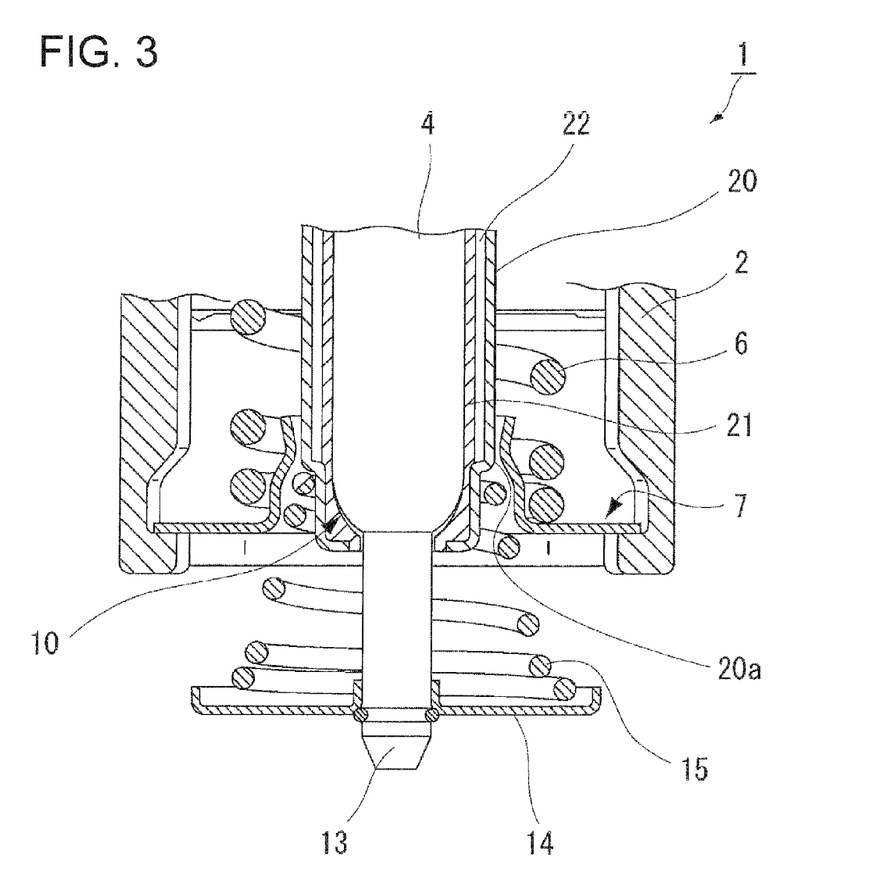
FIG. 3 shows another embodiment of an internal combustion engine cooling device according to the present invention, and is an enlarged cross-sectional view of the main part thereof corresponding to FIG. 2.
Figure 4:
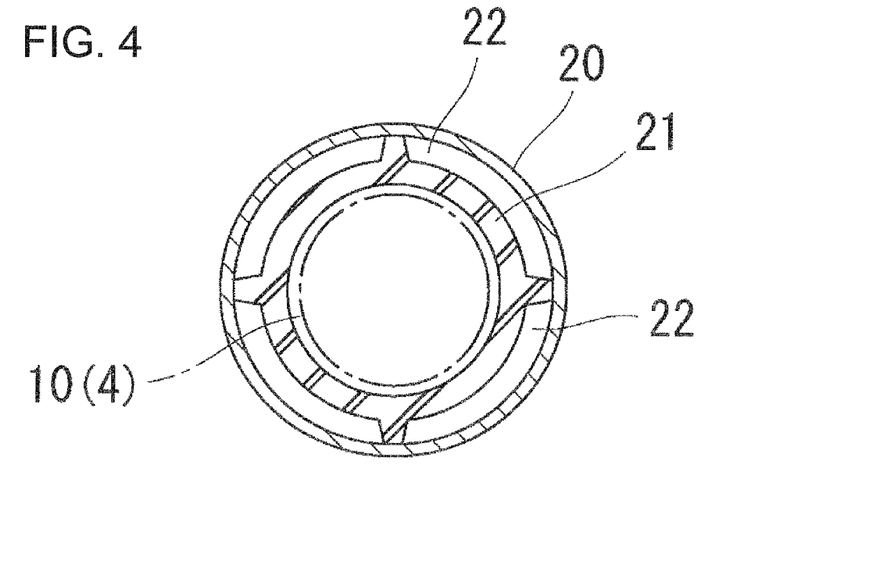
FIG. 4 is a horizontal cross-sectional view of a thermo-element shown in FIG. 3.
Figure 5:
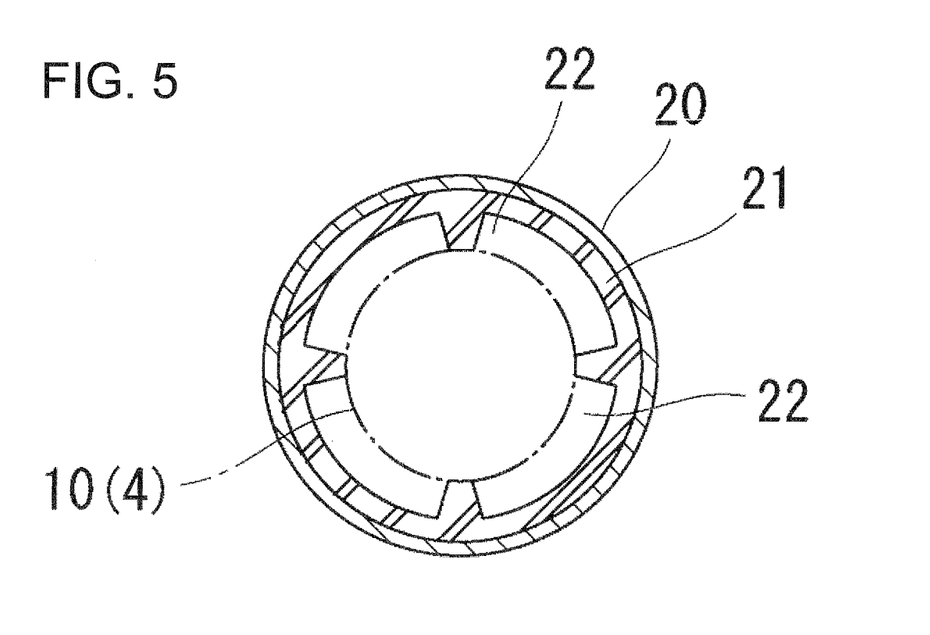
FIG. 5 is a horizontal cross-sectional view of a variation of the thermo-element shown in FIG. 4.

In other words, as shown in FIG. 3, the insulating part may be constituted as a multi-layered structure composed of a resinous insulating material layer (21) consisting of resinous insulating material on the back of the insulating cover 20 and a layer of air 22. A multi-layered insulating part of this type may be formed as a structure including a plurality of projecting portions extending radially outward, provided on the outside of the resinous insulating material layer 21 and extending toward the back side of the insulating cover 20 to form the layer of air 22 as shown in FIG. 4, or a structure including projecting portions provided on the inside of the resinous insulating material layer 21 and extending centripetally inward and forming the layer of air as shown in FIG. 5. The projecting portions provided on the resinous insulating material layer 21 fulfill the function of forming the layer of air 22 while supporting the insulating cover 20 on the outside of the thermo-element (cylinder container 4).

Figure 6:
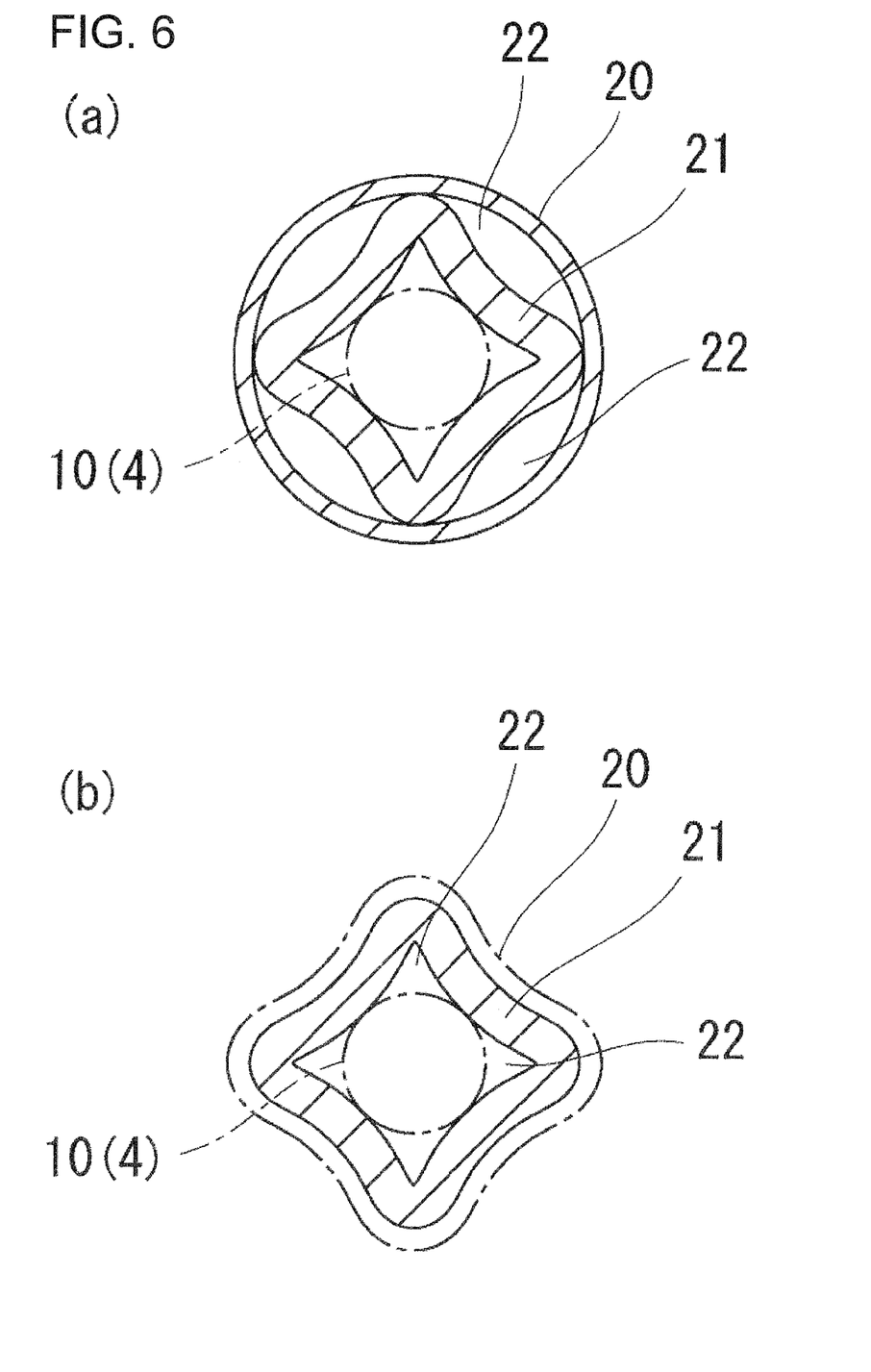
FIGS. 6(a) and 6(b) are horizontal cross-sectional views of variations of the thermo-elements shown in FIG. 4 and FIG. 5.

In addition, as shown in FIGS. 6(a) and (b), the resinous insulating material 21 may be formed in the shape of a cylinder and have a wave-shaped cross-section. FIG. 6(b) shows an example of a configuration in which the insulating cover 20 also is formed in the shape of a cylinder and has a wave-shaped cross-section to match the resinous insulating material 21. In short, any configuration in which the portion formed by the resinous insulating material 21 and the layer of air 22 provide an insulating capability is sufficient. Of course, the shapes of the wave-shaped cross-sections and the number and size of the components shown in FIGS. 6(a) and (b) may be modified and changed as convenient.

Figure 7:
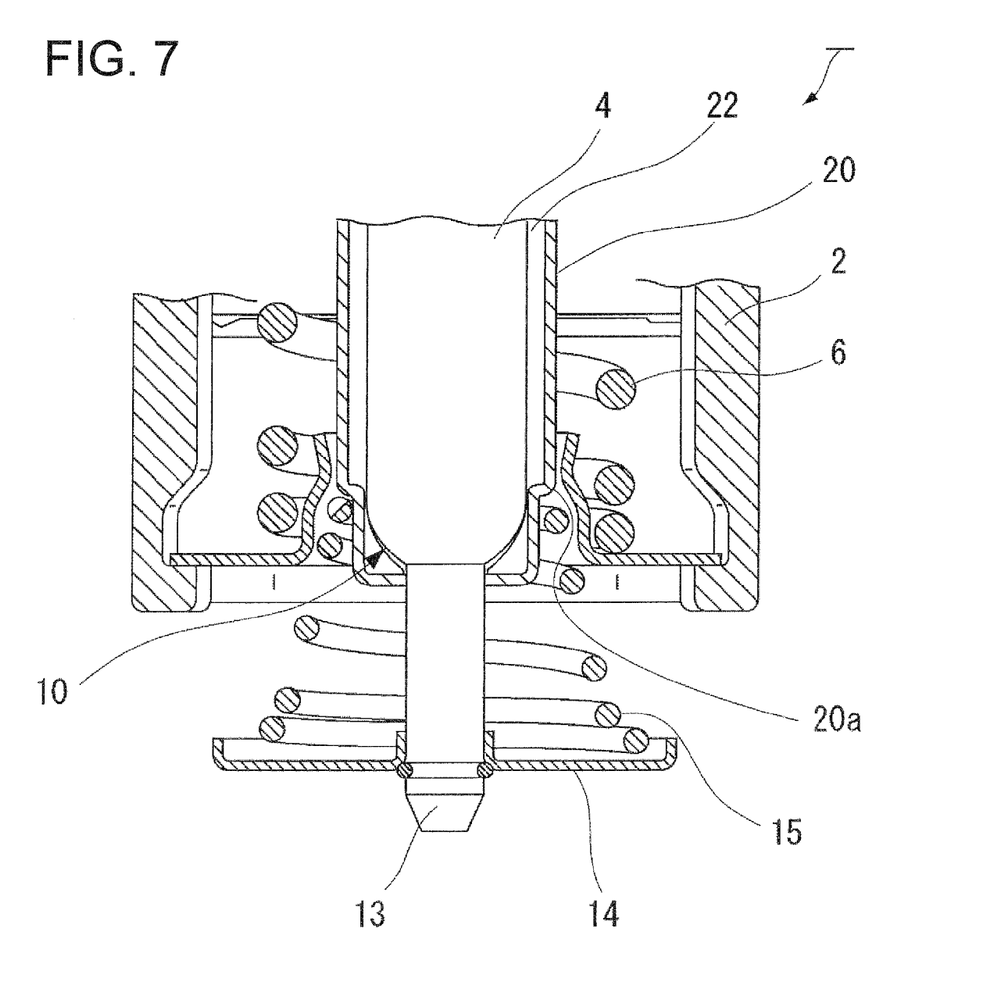
FIG. 7 shows yet another embodiment of an internal combustion engine cooling device according to the present invention, and is an enlarged cross-sectional view of the main part thereof corresponding to FIG. 2 and FIG. 3.

Further, as shown in FIG. 7, a structure in which an annular insulating layer of air 22 is provided between the inside of the insulating cover 20 and the outside of the thermo-sensitive portion of the thermo-element (cylinder container 4) is also possible.

By adopting a structure of this type, the thermal sensitivity of the thermo-element thermo-sensitive portion is able to be degraded to the necessary state, electrical control by heating by the heater H is able to be carried out in the necessary state, and the necessary thermostat operation is able to be obtained.

In the structure shown in FIG. 7, because the inside of the insulating cover 20 is constituted as an insulating layer of air 22, the insulating cover 20 is configured so that the portion of reduced diameter at the bottom of the insulating cover 20 is fitted into the thermo-element (cylinder container 4) for assembly.

Further, although as described above the resinous insulating material 21 is baked onto the inside of the insulating cover 20, the present invention is not limited thereto and instead another structure may be adopted.

It is to be noted that although in the embodiment described above the thermostat device 1 is described as having a built-in rod-shaped heater H, the present invention is not limited thereto and is applicable as well to a thermostat device that does not require electrical control. Alternatively, the above-described insulating material may be constituted as a separate, detachable structure.

What is claimed is:

1. An internal combustion engine cooling device comprising:
   a piston fixedly mounted within a device housing coupled to a plurality of flow paths through which cooling water flows, the piston disposed facing an interior of the device housing;
   a cylinder container that advances and retreats relative to the piston and has a flange valve that opens and closes a main flow path of the cooling water;
   a thermal expansion unit provided within the cylinder container that causes the cylinder container to advance and retreat due to volumetric changes attendant upon temperature changes; and
   a heat-emitting element provided within a piston casing that heats the thermal expansion unit when supplied with electricity,
   wherein an insulating cover is provided to an exterior of the cylinder container at a portion of the cylinder container disposed facing the cooling water,
   wherein the insulating cover is sealed with respect to water flow,
   wherein a resinous insulating material is provided between the inside of the insulating cover and the outside of the cylinder container, up to but excluding a portion of the insulating cover disposed facing a top portion of the cylinder container,
   the portion of the insulating cover disposed facing the top portion of the cylinder container accounting for approximately one-third an entire length of the insulating cover,
   wherein the insulating cover is made of metal.

2. The internal combustion engine cooling device according of claim 1, wherein the internal combustion engine cooling device further comprises a seating that functions as a spring seat that engages one end of a spring means that biases a second flange valve movably provided at a tip of a thermo-sensitive portion of the cylinder container that opens and closes a sub flow path of the cooling water.

3. The internal combustion engine cooling device as claimed in claim 1, wherein a top end of the insulating cover is formed continuous with a valve plate of the flange valve.

4. An internal combustion engine cooling device comprising:

a piston fixedly mounted within a device housing coupled to a plurality of flow paths through which cooling water flows, the piston disposed facing an interior of the device housing;

a cylinder container that advances and retreats relative to the piston and has a flange valve that opens and closes a main flow path of the cooling water;

a thermal expansion unit provided within the cylinder container that causes the cylinder container to advance and retreat due to volumetric changes attendant upon temperature changes; and a heat-emitting element provided within a piston casing that heats the thermal expansion unit when supplied with electricity, wherein an insulating cover is provided to an exterior of the cylinder container at a portion of the cylinder container disposed facing the cooling water, wherein the insulating cover is sealed with respect to water flow, wherein a resinous insulating material is provided on the inside of the insulating cover to form an insulating part constituted as a multi-layered structure composed of a resinous insulating material layer and a layer of air between the insulating cover and the outer surface of the cylinder container, the multi-layered structure provided on the inside of the insulating cover up to but excluding a portion of the insulating cover disposed facing a top portion of the cylinder container, the portion of the insulating cover disposed facing the top portion of the cylinder container accounting for approximately one-third an entire length of the insulating cover, wherein the insulating cover is made of metal.

5. The internal combustion engine cooling device according to claim 4, further comprising a seating that functions as a spring seat that engages one end of a spring means that biases a second flange valve movably provided at a tip of a thermo-sensitive portion of the cylinder container that opens and closes a sub flow path of the cooling water.

6. The internal combustion engine cooling device as claimed in claim 4, wherein a top end of the insulating cover is formed continuous with a valve plate of the flange valve.

7. An internal combustion engine cooling device comprising:

a piston fixedly mounted within a device housing coupled to a plurality of flow paths through which cooling water flows, the piston disposed facing an interior of the device housing;

a cylinder container that advances and retreats relative to the piston and has a flange valve that opens and closes a main flow path of the cooling water;

a thermal expansion unit provided within the cylinder container that causes the cylinder container to advance and retreat due to volumetric changes attendant upon temperature changes; and a heat-emitting element provided within a piston casing that heats the thermal expansion unit when supplied with electricity, wherein an insulating cover is provided to an exterior of the cylinder container at a portion of the cylinder container disposed facing the cooling water, wherein the insulating cover is sealed with respect to water flow, wherein the insulating cover forms a layer of air between the insulating cover and the outer surface of the cylinder container, up to but excluding a portion of the insulating cover disposed facing a top portion of the cylinder container, the portion of the insulating cover disposed facing the top portion of the cylinder container accounting for approximately one-third an entire length of the insulating cover, wherein the insulating cover is made of metal.

8. The internal combustion engine cooling device according to claim 7, further comprising a seating that functions as a spring seat that engages one end of a spring means that biases a second flange valve movably provided at a tip of a thermo-sensitive portion of the cylinder container that opens and closes la sub flow path of the cooling water.

9. The internal combustion engine cooling device as claimed in claim 7, wherein a top end of the insulating cover is formed continuous with a valve plate of the flange valve.

* * * * *